United States Patent [19]
Allison

[11] Patent Number: 5,718,478
[45] Date of Patent: Feb. 17, 1998

[54] INTEGRATED ATTACHMENTS-SEAT FRAME

[75] Inventor: Gregory Allison, Kego Harbor, Mich.

[73] Assignee: Lear Corporation, Southfield, Mich.

[21] Appl. No.: 654,565

[22] Filed: May 29, 1996

[51] Int. Cl.$^6$ ............................................. A47C 1/02
[52] U.S. Cl. ................... 297/344.1; 297/218.1; 297/452.38
[58] Field of Search ................... 297/344.1, 218.1, 297/344.26, 452.38; 248/430, 429

[56] References Cited

U.S. PATENT DOCUMENTS

| | | |
|---|---|---|
| 3,685,872 | 8/1972 | Babbs . |
| 3,930,632 | 1/1976 | Shigeta et al. . |
| 4,492,408 | 1/1985 | Lohr ........................ 297/344.1 |
| 4,666,209 | 5/1987 | Kazaoka et al. ......... 297/344.1 |
| 4,720,073 | 1/1988 | Mann et al. . |
| 4,828,214 | 5/1989 | Kanai et al. ........... 297/344.1 X |
| 4,948,189 | 8/1990 | Terada et al. . |
| 5,188,329 | 2/1993 | Takahara ................ 297/344.1 X |
| 5,439,271 | 8/1995 | Ryan ....................... 297/344.1 X |

Primary Examiner—Laurie K. Cranmer
Attorney, Agent, or Firm—Howard & Howard

[57] ABSTRACT

A seat assembly (10) of the type utilized in automotive vehicles for supporting an occupant including a track with upper (18) and lower (20,20') rails, the upper rail (18) being an extruded C-shaped channel having side walls (26 and 28) and a top (34) extending therebetween. The upper rail (18) is characterized by a retaining wing (30) integral with and extending downwardly (30) and upwardly (32) from and in spaced relationship to the adjacent side wall (26). A tab (40) extends outwardly from the first side (26) and forms an extension of the top (34). A suspension (50) for supporting a cushion (54) is attached to a pair of spaced members (18) by suspension hooks (52) which are hooked over the tabs (40). A fabric cover (56) is disposed over the cushion and is attached to the members (18) by trim hooks which are likewise hooked over the wings (30).

10 Claims, 3 Drawing Sheets

5,718,478

INTEGRATED ATTACHMENTS-SEAT FRAME

TECHNICAL FIELD

The subject invention relates to an automotive seat assembly and, more particularly, to the frame of such an assembly.

BACKGROUND OF THE INVENTION

Conventional seat assemblies for the driver and first passenger for automotive vehicles typically include a seat frame covered with cushions and trim with the frame mounted to the vehicle by a seat track having upper and lower rails for adjusting the fore and aft position of the seat. The seats typically include a suspension for supporting a foam cushion, which is, in turn, covered by trim such as fabric. There is a constant need for improved methods of attaching the suspension systems and/or fabric covers to the seat frame.

SUMMARY OF THE INVENTION AND ADVANTAGES

A seat assembly of the type utilized in automotive vehicles for supporting an occupant and comprising a seat frame defining an occupant sitting area and a back frame defining an occupant back supporting area. At least a section of one of the frames has oppositely facing first and second sides characterized by a retaining wing integral with and extending from spaced one of the sides.

In accordance with the subject invention, the trim may be simply attached to the seat frame by hooks which attach to the trim and hook over the wing.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
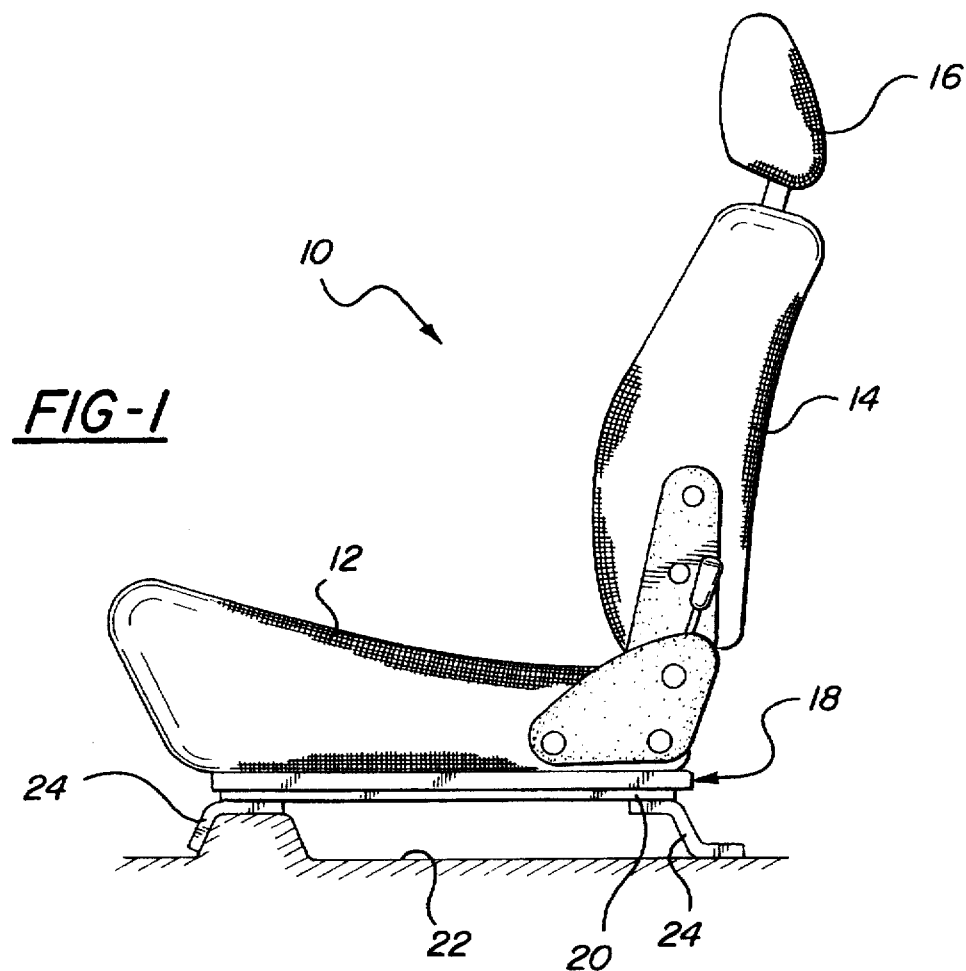
FIG. 1 is an environmental view of an automotive seat assembly incorporating the subject invention.

Referring to the Figures, wherein like numerals reference like or corresponding parts throughout the several views, a seat assembly of the type utilized in automotive vehicles for supporting an occupant is generally shown at 10. The seat assembly 10 includes a seat frame 12 defining an occupant sitting area and a back frame 14 defining an occupant back supporting area. A headrest 16 is supported on the top of the seatback frame 14.

The frames of the assembly 10 include at least one section of the subject invention, and as illustrated that section is the upper rail, generally indicated at 18, of the seat track assembly, which track assembly also includes a lower rail 20 attached to the floor 22 of a vehicle by the brackets 24.

The upper rail 18 is an integral channel having oppositely facing first and second sides 26 and 28. The rail section 18 is characterized by a retaining wing 30 integral with and extending from and in spaced relationship to the first side 26. The wing 30 extends to a distal end spaced from the first side 26.

The upper track section 18 is a C-shaped channel as viewed in cross-section with a top 34 extending between the first 26 and 28 second sides and a bottom having a longitudinal slot 36 to define bottom flanges 38 extending inwardly from the lower extremities of the sides 26 and 28 to the edges of the slot 36. A tab 40 extends outwardly from the first side 26 and forms a co-planar extension of the top wall 34.

The lower rail 20 is slidably disposed and retained in the upper rail 18 by bolts or mounts 42 which extend through the slot 36 in the bottom of the C-shaped upper rail 18, the bolts 42 being supported by the brackets 24.

A lip 44 extends along the distal end of the wing 30 on the side thereof facing the adjacent side 26.

Figure 2:
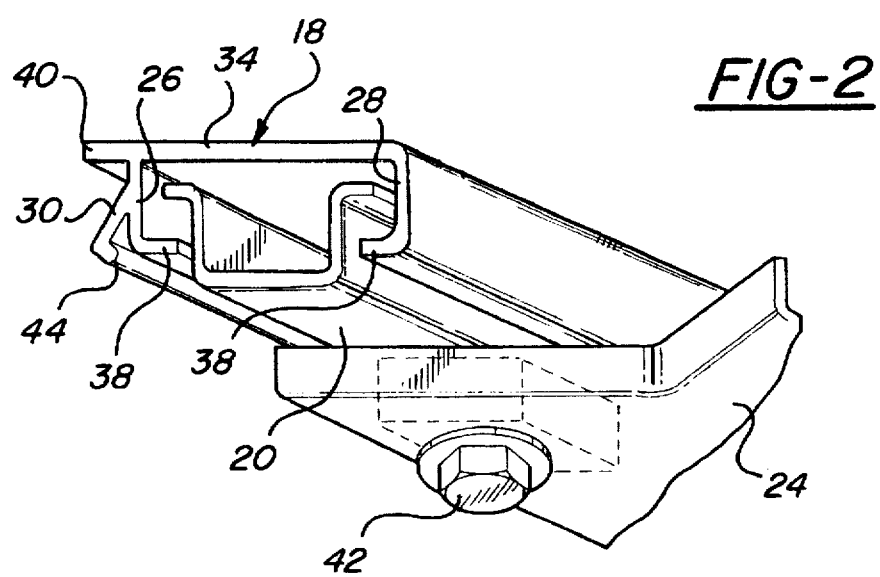
FIG. 2 is a perspective view of a first embodiment of a seat track constructed in accordance with the subject invention.
Figure 3:
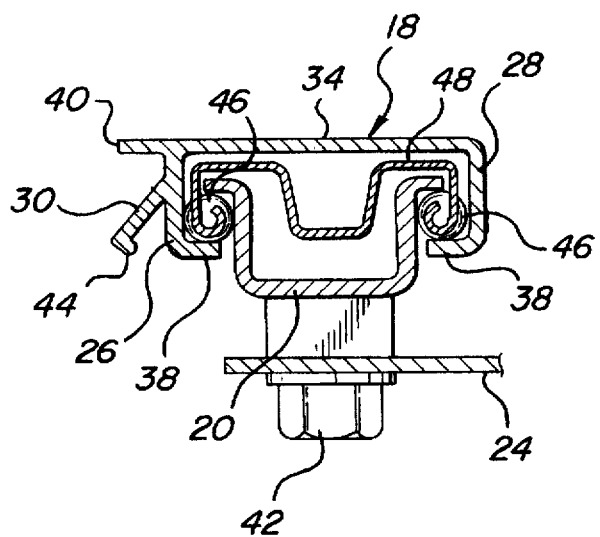
FIG. 3 is a cross sectional view of the assembly of FIG. 2.
Figure 4:
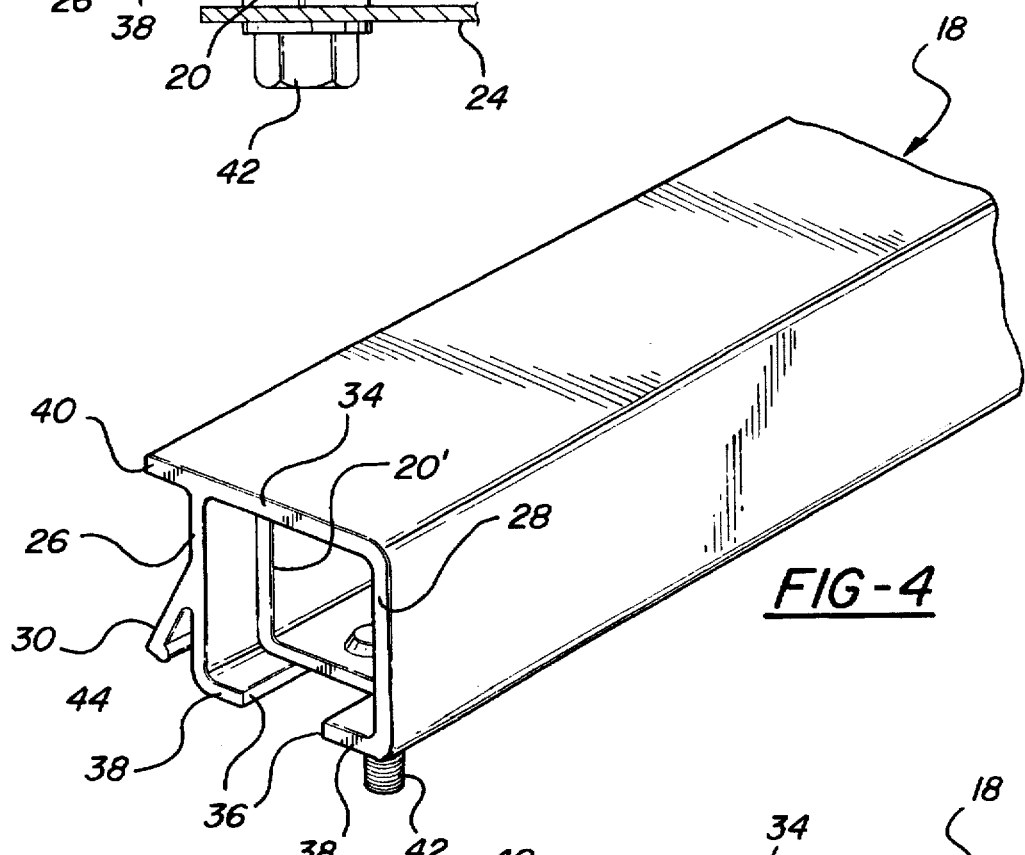
FIG. 4 is a perspective view of a second embodiment of a seat track constructed in accordance with the subject invention.
Figure 5:
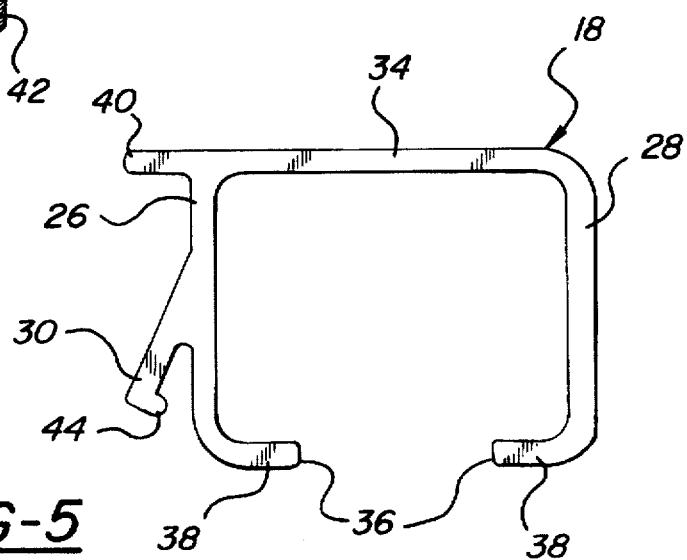
FIG. 5 is an end view of the upper track member of the assembly of FIG. 4.
Figure 6:
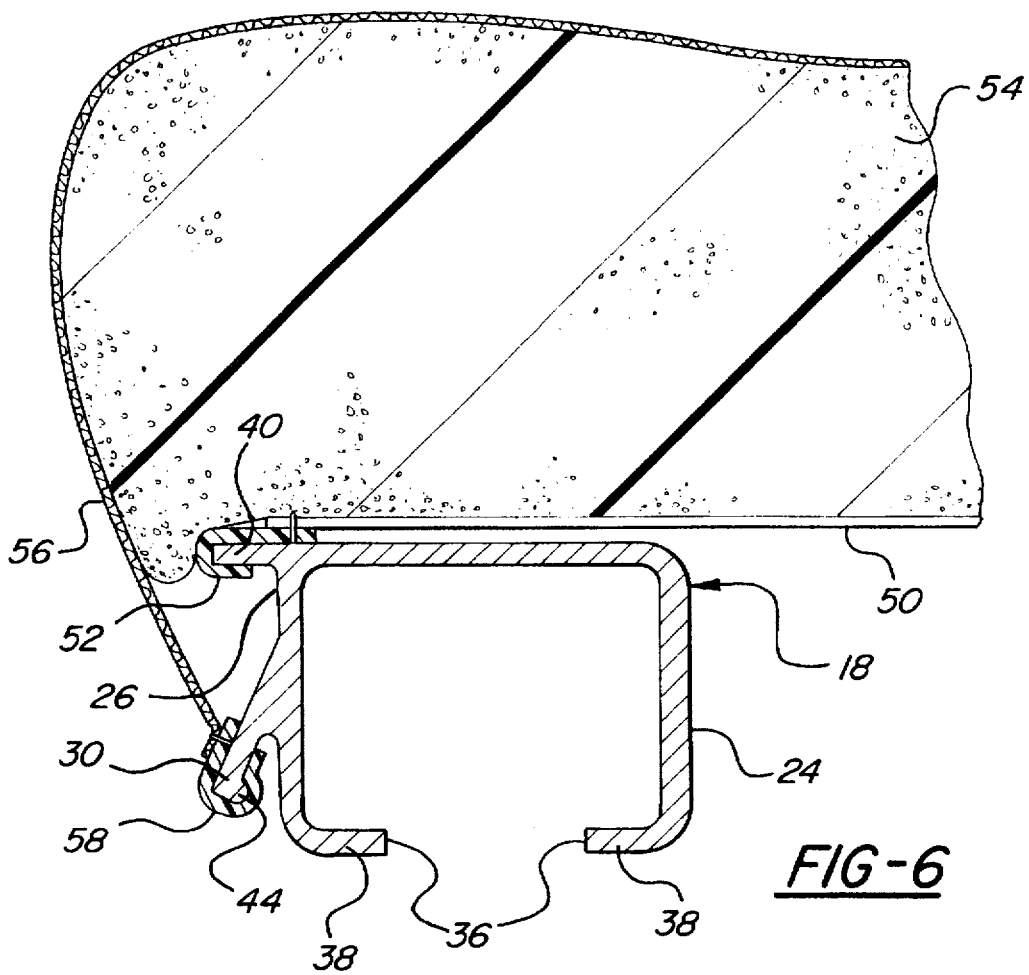
FIG. 6 is a view similar to FIG. 2 but showing the seat trimmed out.

In the embodiment of FIGS. 1 through 3, the lower rail has a generally T-shaped cross section with the top flanges supported on ball bearings 46 which are in rolling engagement with the bottom flanges 38 of the C-shaped channel to define roller elements disposed between the upper and lower rails to facilitate the sliding movement between the rails. A bearing cage 48 separates the balls along the rails. In the embodiment of FIGS. 4 and 5, the lower rail 20' is slidably supported within the upper seat supporting rail 18.

In accordance with the subject invention, a pair of the channel members 18 are spaced from one another on opposite sides of the seat assembly with the tabs 40 extending outwardly from the sides and a suspension 50 extends between the spaced channel members 18. A plurality of suspension hooks 52 are attached to the suspension 50 on each side and are hooked over the tab 40 of the adjacent channel member 18. The suspension 50 is one of many well known types, such as a wire net, or the like. A foam cushion 54 is disposed on the suspension 50 and a trim material 56 covers the cushion 54. The trim material 56 is attached to the channel member 18 by a plurality of trim hooks 58 attached to the trim 56 and hooked over the wing 30. The trim is typically fabric, leather, or the like. The hooks 52 and 58 are preferably identical for efficiency.

Figure 7:
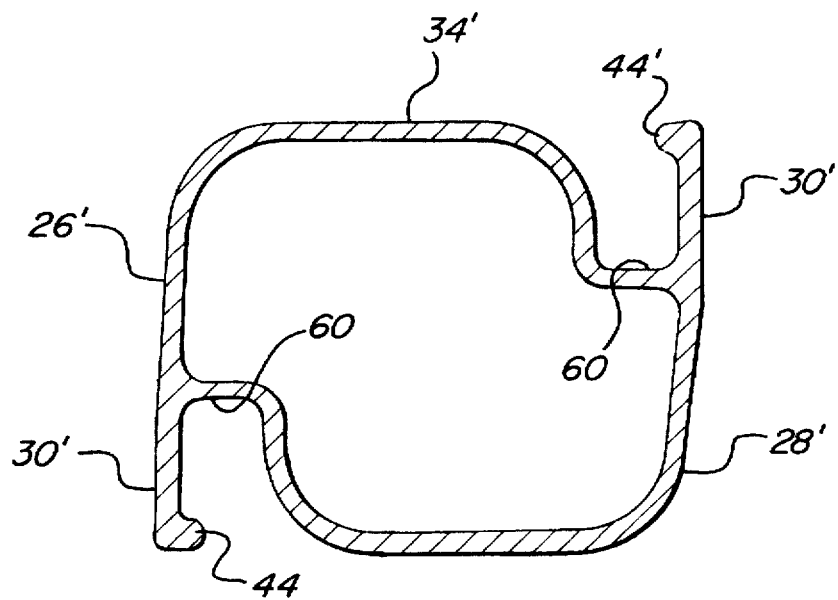
FIG. 7 is a cross sectional view of an alternative channel member of the subject invention.

An alternative embodiment is shown in FIG. 7 wherein the like numerals with an indicate like or corresponding parts to the previous embodiments. An assembly as shown in FIG. 7 side 26', 28' includes a recess 60 in each side 26', 28' and a wing 30' extends from each side 26', 28 in the plane of the adjacent side so as to define one wall of the recess 60. The channel member is symmetrical about any transverse axis to include a pair of the recesses 60 and a pair of the wings 30' extend in opposite directions from opposite sides 26' 28' of the channel. The channel shown in FIG. 7 is most advantageously used as the seat back frame.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A seat assembly of the type utilized in automotive vehicles for supporting an occupant, said assembly comprising:

a seat frame defining an occupant sitting area;

a back frame defining an occupant back supporting area;

at least a section of one of said frames having oppositely facing parallel and symmetrical first and second sides wherein said section is a channel member as viewed in cross-section with a top extending between said first and second sides;

a retaining wing integral with and extending outwardly from said first side to a distal end spaced from said first side;

a tab integral with said top extending outwardly from said first side and forming a linear extension of said top; and including trim material and at least one trim hook attached to said trim material and hooked over said wing.

2. An assembly as set forth in claim 1 including a pair of said channel members spaced from one another on opposite sides of said seat assembly with said tabs extending outwardly from said sides, a suspension extending between said spaced channel members, and at least one suspension hook attached to said suspension on each side and hooked over said tab of the adjacent channel member.

3. An assembly as set forth in claim 2 including mounts secured to said lower rail and extending downwardly for securing said seat assembly to the structure of a vehicle.

4. An assembly as set forth in claim 3 including roller elements disposed between said upper and lower rails to facilitate the sliding movement between said rails.

5. An assembly as set forth in claim 1 wherein said channel defines the upper rail of a seat track, said seat track including a lower rail slidably disposed and retained in said upper rail.

6. An assembly as set forth in claim 1 including a lip extending along said distal end of said wing and on the inward side of said wing toward the adjacent side.

7. An assembly as set forth in claim 1 wherein said first side defines a plane and includes a recess and said wing extends from said first side along the plane of said side and defines one wall of said recess.

8. An assembly as set forth in claim 7 wherein said channel member is symmetrical to include a pair of said recesses and a pair of said wings extending in opposite directions from opposite sides of said channel.

9. A seat assembly of the type utilized in automotive vehicles for supporting an occupant, said assembly comprising:

a seat frame defining an occupant sitting area;

a back frame defining an occupant back supporting area;

at least a section of one of said frames having oppositely facing first and second sides;

a retaining wing integral with and extending from said first side to a distal end spaced from said first side;

said side defining a plane and including a recess, said wing extending from said side along the plane of said side and defining one wall of said recess; and said section is symmetrical to include a pair of said recesses and a pair of said wings extending in opposite directions from opposite sides of said section.

10. A seat assembly of the type utilized in automotive vehicles for supporting an occupant, said assembly comprising:

a seat frame defining an occupant sitting area;

a back frame defining an occupant back supporting area;

at least one of said frames including a pair of channel members spaced from one another on opposite sides of said seat assembly;

each of said channel members including oppositely facing parallel and symmetrical first and second sides with a top extending between said sides;

a retaining wing integral with and extending outwardly from said first side to a distal end spaced from said side;

a tab integral with said top extending outwardly from said first side and forming a linear extension of said top;

trim material extending between said spaced channel members and having at least one trim hook attached to said trim and hooked over said wing on each channel member; and a suspension extending between said spaced channel members and having at least one suspension hook attached to said suspension on each side and hooked over said tab of said respective adjacent channel member.

* * * * *